United States Patent [19]
Jelusic

[11] 3,794,456
[45] Feb. 26, 1974

[54] MULTI-STAGE PUMP-TURBINE
[75] Inventor: Fedor Jelusic, Zagreb, Yugoslavia
[73] Assignee: Escher Wyss Limited, Zurich, Switzerland
[22] Filed: Aug. 7, 1972
[21] Appl. No.: 278,232

[52] U.S. Cl.............. 415/122, 415/153, 415/500, 290/52
[51] Int. Cl............................ F01d 1/08, F01d 1/28
[58] Field of Search.........415/153, 152, 500, 199 A, 415/219 C, 156, 147, 151, 150, 157, 158, 415/140; 290/52

[56] References Cited
UNITED STATES PATENTS
2,321,276  6/1943  De Bolt.............................. 415/147
FOREIGN PATENTS OR APPLICATIONS
1,067,496  1/1954  France................................ 415/500
643,530    9/1950  Great Britain..................... 415/152

Primary Examiner—Henry F. Raduazo
Attorney, Agent, or Firm—Robert A. Ostmann; Austin P. Dodge

[57] ABSTRACT

A multi-stage pump turbine, especially for pumped-storage power station; the stages, operating on a common shaft, arranged in series; actuating means such as fixed connecting conduits passing the power medium between the individual stages as well as adjustable elements for shutting off the connecting conduits for the purpose of switching at least one stage on or off from the power medium side; optionally a clutch as an actuating means between the shaft and the rotor contained in the stage that can be switched on or off; all the stages and all the actuating means arranged in a common housing.

7 Claims, 4 Drawing Figures

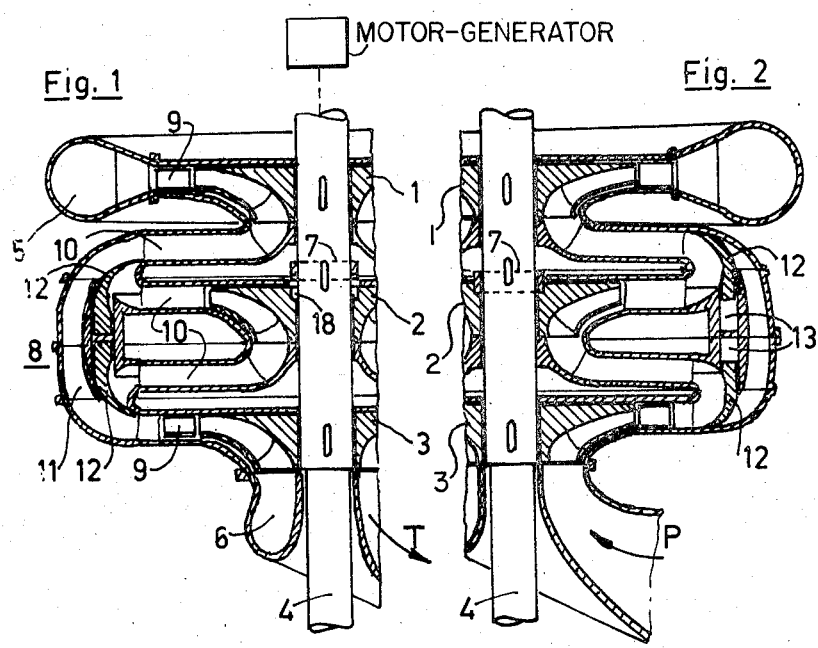
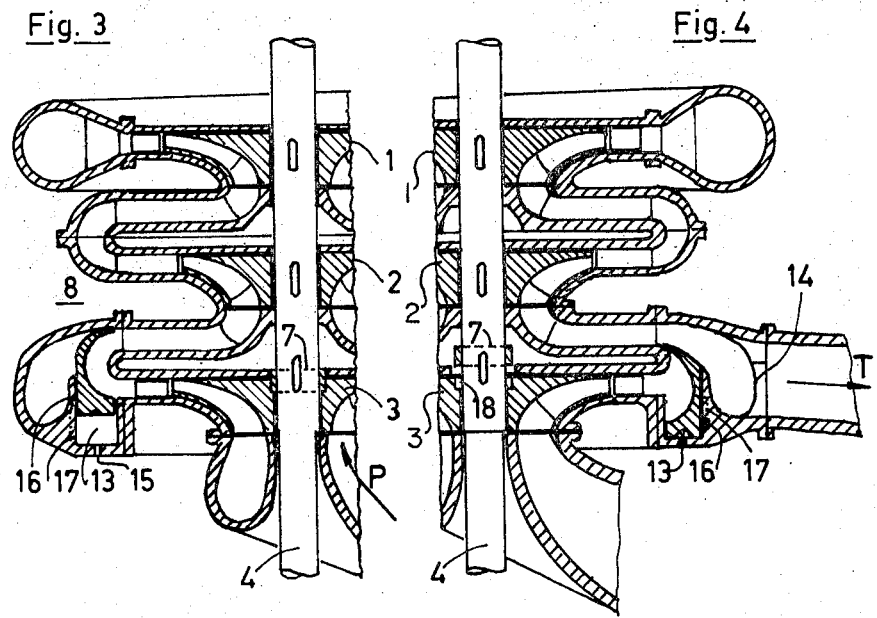

MULTI-STAGE PUMP-TURBINE

BACKGROUND OF THE INVENTION

The invention concerns a multi-stage pump turbine, especially for pumped storage power stations and comprising stages arranged in series as seen in the direction of flow of the power medium and operating on a common shaft, and further comprising fixed actuating means and adjustable actuating means, i.e., firstly fixed connecting conduits for passing the power medium between the individual stages, secondly at least one adjustable element for shutting off the connecting conduits for the purpose of switching at least one stage on or off from the power medium side, and thirdly and optionally a clutch between the shaft and the rotor contained in the stage that can be switched on or off.

A pump turbine of this kind is disclosed, for example, in Swiss Pat. Specification No. 416,502. In this pump turbine, account is taken of the fact that it is known that a pump turbine when used as a pump does not attain the same efficiency as when used as a turbine, so that when it is operating as a pump one extra pump stage for example is necessary depending upon the particular design of such aggregate. In the known assemblies of this kind consisting of pumps and pump turbines, considerable space is required for installing the plant, and its overall efficiency is reduced by the energy losses in the long connecting conduits and/or in the shut-off elements.

SUMMARY OF THE INVENTION

The object of the invention is to achieve greater efficiency in pump turbines of said kind, accompanied by reduction in the space hitherto required for accommodating them.

According to the present invention, this object is achieved in the case of the initially described pump turbine by arranging all the stages and all the actuating means in a common housing, whereby of said actuating means the connecting conduits taking the form of annular passages coaxial with the shaft, and the shut-off element being a ring slide coaxial with the shaft; there are also provided displacement means for axially moving the cut-off element of the ring slide into one or other of the actuating positions.

It is also of advantage if the transverse contour of the cut-off element of the ring slide is crescent-shaped and is so formed that in each of the two actuating positions of the cut-off element, that of its walls presented to the passage supplying at the moment the power medium completes the contour of the passage.

Displacement of the cut-off element is facilitated by the provision of guide means which hold the cut-off element at right angles to the shaft during displacement, said guide means preferably being pins on the cut-off element which engage in helicoidal slots in the housing.

An advantageous installation comprising only one ring slide is achieved in that the one, at least, stage that can be switched on or off is the underwater-side stage, and in that a discharge conduit is provided which passes the power medium, leaving this switched off stage, into the underwater.

An advantageous arrangement for switching the one stage on or off from the shaft side also is achieved if the clutch that may be provided takes the form of a gear coupling comprising a toothed ring which is axially displaceable but not rotatable on the shaft, recesses for the teeth of this ring being provided in the rotor, and means being provided for displacing the toothed ring to achieve engagement or disengagement.

BRIEF DESCRIPTION OF THE DRAWING

The invention will now be described and explained in greater detail by reference to the annexed drawing, in which FIG. 1 is an axial longitudinal section through an embodiment of the invention moved into the position for operation as a turbine in which one stage is cut out, FIG. 2 is an axial longitudinal section through the same embodiment as FIG. 1, but in the position for operation as a pump, in which said one stage is switched in, FIG. 3 is an axial longitudinal section through a further embodiment in the position for operating as a pump, and FIG. 4 is an axial longitudinal section through the same embodiment as FIG. 3, but in the other operating position, i.e. that for operation as a turbine.

DESCRIPTION OF THE PREFERRED EMBODIMENTS

The first embodiment, shown in FIGS. 1 and 2, is a three-stage pump turbine for a pumped-storage power station. It comprises three stages arranged in series as seen in the direction of flow of the power medium and incorporating rotors 1, 2 and 3. The three stages operate on a common shaft 4. The shaft 4 is connected to a motor generator and is vertically disposed. It would however also be possible to mount the pump turbine in consequence of the invention horizontally.

To enable the pump turbine to be changed over for operation firstly as a pump and then as a turbine, actuating means are provided which are fixed on the one hand and adjustable on the other.

These actuating means are firstly the connecting conduits. The power medium flows through these to or between the individual stages comprising the rotors 1, 2 and 3, and for operation as a turbine (shown in FIG. 1) the power medium flows from a helical headwater housing 5 to a helical underwater housing 6, and for operation as a pump (shown in FIG. 2) it flows from the helical underwater housing 6 to the helical headwater housing 5. The direction of flow during operation as a turbine is shown in FIG. 1 by means of the arrow T, and the direction of flow during operation as a pump is shown in FIG. 2 by means of the arrow P.

Further actuating means, i.e., adjustable shut-off elements, are fitted to the connecting conduits for engaging or disengaging the one stage from the power medium side, and in this embodiment, for engaging or disengaging the stage comprising the rotor 2 for the purpose of switching to turbine or pump operation.

A third actuating means is a clutch comprising a toothed ring and located between the shaft 4 and the rotor 2 contained in the stage that can be engaged or disengaged. During operation as a turbine, the rotor 2 can also be disengaged from the shaft side. This actuating position of the toothed ring 7 in which only the stages comprising the rotors 1 and 3 are operating, is shown in FIG. 1. During operation as a pump, the rotor 2 is engaged from the shaft side, and all three stages, incorporating the rotors 1, 2 and 3, now become operative. This position of the toothed ring 7 is shown in FIG. 2.

All these stages of the pump turbine comprising the rotors 1, 2 and 3, as well as all the actuating means, i.e., the connecting conduits, the shut-off elements and the clutch are contained in a common housing. Said common housing is designated by the numeral 8.

The connecting conduits take the form of annular passages coaxial with the shaft 4; as is normal in the case of fluid-flow installations, they are provided with adjustable guide blades 9 or fixed guide blades 10.

Provided between the stage comprising the rotor 1 and the next-but-one stage incorporating the rotor 3 is a by-pass passage 11, the function of which is to divert the power medium past the stage containing the rotor 2 which is excluded when the installation operates as a turbine. This stage containing the rotor 2 which is brought in only for operation as a pump, is simply designed as a pump.

The shut-off elements take the form of ring slides which are disposed coaxially with the shaft 4 and comprise cut-off elements 12. Known hydraulic displacement means are provided for axially moving the cut-off element 12 of the ring slide into one or other of the operating positions shown in FIGS. 1 and 2. An unoccupied space 13 in the housing and between the cut-off elements 12 is designed as a hydraulic pressure chamber. The annular walls of the chamber 13 also perform the function of guiding the cut-off element 12 during displacement.

The displacement means may also take the form of a plurality of individual servo-motors acting on the cut-off element 12. Mechanical displacement means for moving the cut-off element 12 of the ring slide could also be used.

If, as shown in FIG. 1, the two cut-off elements 12 are drawn towards each other, the by-pass passage 11 is opened and the stage comprising the rotor 2 is cut out from the power medium side. FIG. 2 shows the two cut-off elements 12 moved apart from each other; this closes the by-pass passage 11, and the stage comprising the rotor 2 is switched in from the power medium side.

The transverse contour of the cut-off element 12 is crescent-shaped and is so formed that in both of the positions into which the cut-off element 12 is moved, that of its walls presented to the passage that is supplying at the moment power medium completes the contour of this passage. In the position shown in FIG. 1, the by-pass passage 11 supplies the operating medium, and the walls of the cut-off elements 12 remote from the shaft 4 complete the contour of the by-pass passage 11. In the position seen in FIG. 2, it is those walls of the cut-off elements 12 facing the shaft 4 that complete the contour of the passages leading to the stage comprising the rotor 2.

In the embodiment illustrated in FIGS. 3 and 4, it is the underwater-side stage comprising the rotor 3 that can be engaged or disengaged. When the installation is operating as a turbine, the successive headwater side stages comprising the rotors 1 and 2 are brought into operation. A discharge conduit 12 is provided between the stages comprising the rotors 2 and 3 and this carries the power medium leaving the stage comprising the rotor 3, when it is switched off away into the underwater.

In this machine, only one ring slide for engaging and disengaging the underwater side stage comprising the rotor 3 is necessary. This stage, which is brought in only when the installation is to operate as a pump, is simply designed as a pump.

The form and mounting of this ring slide and the means for displacing the cut-off element 12 are similar to those of the ring slides of the pump turbine described by reference to FIGS. 1 and 2. A pressure chamber 13 is connected by means of openings 15 in the housing 8 to a hydraulic displacement system, not illustrated.

When the cut-off element 12 is in one of its positions as shown in FIG. 3, the machine operates as a pump. The pressure chamber 13 is filled with pressurized fluid and the underwater side stage comprising the rotor 3 is brought in from the power medium side. In that position of the cut-off element 12 shown in FIG. 4, the machine operates as a turbine. The pressure chamber 13 is voided, the cut-off element 12 is drawn into this chamber, and the stage comprising the rotor 3 is cut out from the power medium side. The power medium passes from the machine, leaving the underwater side stage, comprising the rotor 3, by way of the discharge conduit 14 into the underwater.

In order to hold the cut-off element 12 at right-angles to the shaft 4 during displacement, i.e., to prevent its tilting, it is provided with pins 16 which engage in helicoidal slots 17.

To enable the rotor 2 (in FIGS. 1 and 2), respectively the rotor 3 (in FIGS. 3 and 4) also to be disengaged from the shaft 4 in the stage which can be switched in or out, a geared coupling comprising a toothed ring 7 is provided in each case. The toothed ring 7 is mounted on the shaft 4 in such manner that it cannot rotate but is axially displaceable. The rotors 2 respectively 3 are rotatably mounted on the shaft.

The teeth of the toothed ring 7 fit into the recesses 18 formed in the rotors 2 respectively 3 adapted to be engaged or disengaged. Known, not shown, hydraulic means are provided for displacing the toothed ring 7 for the purpose of engaging and disengaging the rotors 2 and 3. The connecting conduits, not shown, of a displacement means, extend through the shaft. It would also be possible to use a mechanical device for displacing the toothed ring 7.

If the machine is switched to the position for operating as a pump as illustrated in FIGS. 2 and 3, the rotor 2 respectively 3 is engaged and rotated with the shaft 4.

If the machine is switched to the position for operating as a turbine, as shown in FIGS. 1 and 4, the rotor 2 respectively 3 is disengaged.

I claim:

1. A pumped storage water power station of the type including a pump part, a pump-turbine part and a motor-generator, all of which are coupled together by shaft means incorporating a clutch which allows the pump part to be selectively disconnected from the other components; a connecting passage for conveying water being pumped from an underwater region serially through both of said parts; a by-pass conduit which by-passes the pump part and conveys water acting as power medium from a headwater region solely through the pump-turbine part; and switch-over means for opening and closing said conduits; and characterized in that a. said pump and pump-turbine parts are sections of a unitary hydraulic machine having a common housing that contains those parts and a common shaft;
b. said pump part has an impeller, and said clutch serves selectively to couple the impeller with or disconnect it from the common shaft;
c. said connecting and by-pass conduits are annular passages within the housing which are coaxial with the common shaft; and
d. said switch-over means comprises a crescent-shaped ring slide coaxial with the common shaft and movable between a pump operation position in which it opens the connecting conduit and closes the by-pass conduit, and a turbine operation position in which it closes the connecting conduit and opens the by-pass conduit.

2. Apparatus as defined in claim 1 in which the ring slide has
a. an inner peripheral surface which forms a portion of the wall of the connecting conduit in said pump operation position; and
b. an outer peripheral surface which forms a portion of the wall of the by-pass conduit in said turbine operation position.

3. Apparatus as defined in claim 1 including guide means which holds the ring slide at right angles to the common shaft during movement of the slide.

4. Apparatus as defined in claim 3 in which the guide means comprises pins carried by the ring slide which engage helicoidal slots in the housing.

5. Apparatus as defined in claim 1 in which the pump section is disposed at the underwater side of the unitary machine and is provided with a discharge passage which drains the section when the ring slide is in said turbine operation position and the clutch is disengaged.

6. Apparatus as defined in claim 1 in which the clutch includes a toothed ring which rotates with but is free to slide axially of the common shaft, and recesses for the teeth of said toothed ring formed in the impeller of the pump section.

7. Apparatus as defined in claim 1 in which at least the pump-turbine part includes multiple stages interconnected by annular passages within the housing which are coaxial with the common shaft.

* * * * *